US012329705B1

(12) United States Patent

Nowosiwsky

(10) Patent No.: US 12,329,705 B1

(45) Date of Patent: Jun. 17, 2025

(54) INCONTINENCE CARE SLING

(71) Applicant: Tamara Nowosiwsky, Portland, OR (US)

(72) Inventor: Tamara Nowosiwsky, Portland, OR (US)

( * ) Notice: Subject to any disclaimer, the term of this patent is extended or adjusted under 35 U.S.C. 154(b) by 0 days.

(21) Appl. No.: 18/674,472

(22) Filed: May 24, 2024

Related U.S. Application Data

(60) Provisional application No. 63/611,545, filed on Dec. 18, 2023.

(51) Int. Cl.
*A61G 7/00* (2006.01)
*A61G 7/10* (2006.01)

(52) U.S. Cl.
CPC .................................. *A61G 7/1051* (2013.01)

(58) Field of Classification Search
CPC ....... A61F 2/0045; A61G 7/00; A61G 7/0005; A61G 7/0504; A61G 7/001
See application file for complete search history.

(56) References Cited

U.S. PATENT DOCUMENTS

2011/0023231 A1* 2/2011 Thomas ............... A61G 7/1023 5/81.1 T
2012/0090089 A1* 4/2012 Stryker ................ A61G 7/1048 5/87.1
2015/0047120 A1* 2/2015 Partridge ............... A61G 7/001 53/396
2021/0330531 A1* 10/2021 Wiggermann ....... A61G 7/1023

* cited by examiner

*Primary Examiner* — Carrie R Dorna
*Assistant Examiner* — Joshua Daryl D Lannu

(57) ABSTRACT

An apparatus includes a sling and a sling anchor. The sling is configured to support a patient. The sling anchor is configured to position under a mattress of a bed, and to anchor at least one end of the sling.

20 Claims, 5 Drawing Sheets

INCONTINENCE CARE SLING

CROSS-REFERENCE TO RELATED APPLICATION AND PRIORITY CLAIM

This application claims priority under 35 U.S.C. § 119 (e) to U.S. Provisional Patent Application No. 63/611,545 filed on Dec. 18, 2023, which is hereby incorporated by reference in its entirety.

TECHNICAL FIELD

This disclosure relates generally to medical devices and processes. More specifically, this disclosure relates to an incontinence care sling.

BACKGROUND

A large number of patients in hospitals, hospice care and home care require moving and repositioning to check for different issues, such as bed sores or cleaning messes. In order to move the patient, nurses or other staff need to rotate the patient on their side while the patient remains in the bed. Repeatedly performing these services every day can cause injury to the caregivers.

SUMMARY

This disclosure provides an incontinence care sling.

In a first embodiment, an apparatus includes a sling and a sling anchor. The sling is configured to support a patient. The sling anchor is configured to position under a mattress of a bed, and to anchor at least one end of the sling.

In a second embodiment, an apparatus includes an upper sling, a lower sling, and a sling anchor. The upper sling is configured to support a torso of a patient. The lower sling is configured to support legs of the patient. The sling anchor is configured to position under a mattress of a bed, and configured to anchor a first end of the upper sling and a first end of the lower sling.

Other technical features may be readily apparent to one skilled in the art from the following figures, descriptions, and claims.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
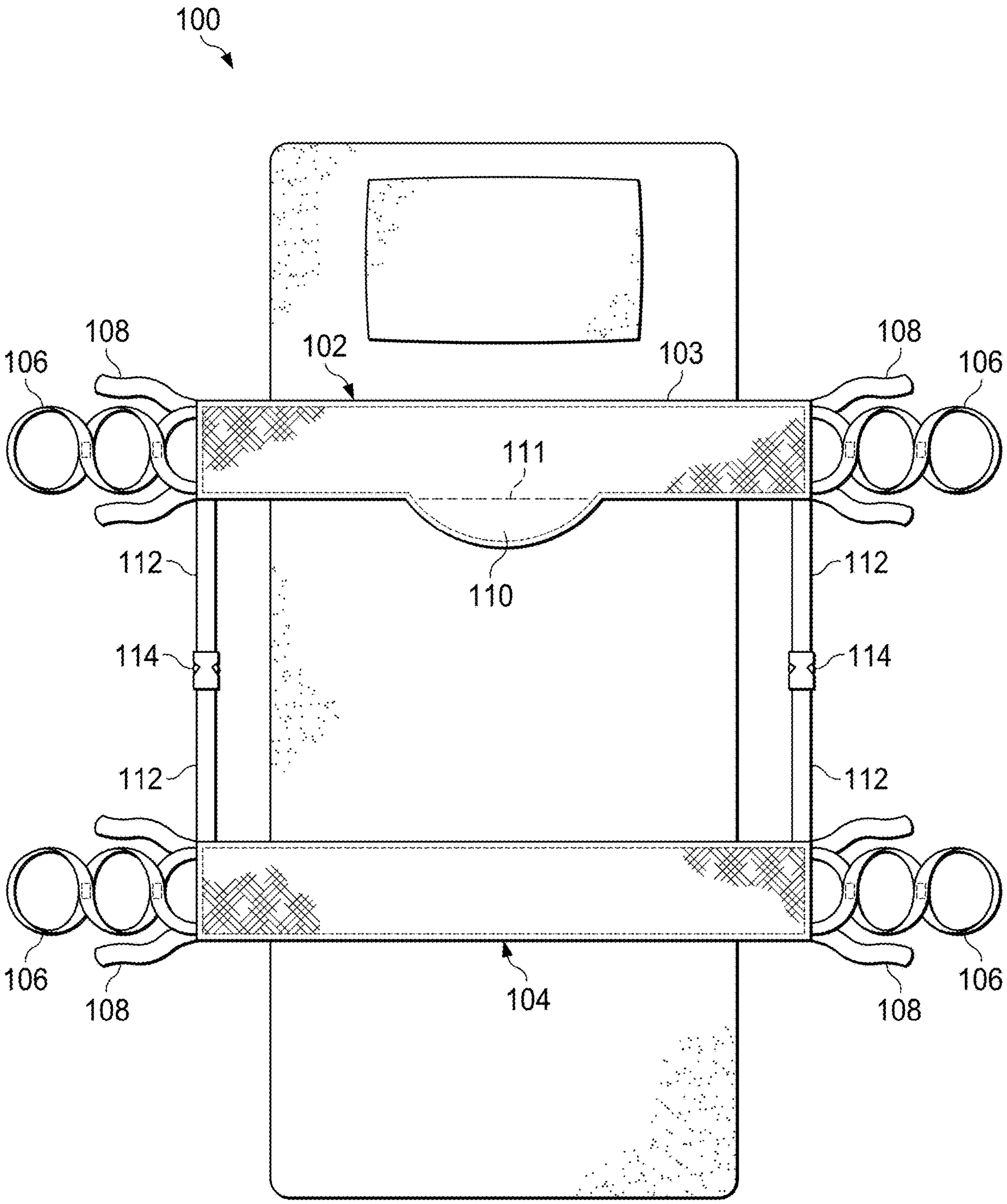
FIGS. 1 through 4 illustrate an example incontinence care sling in accordance with this disclosure.
Figure 2:
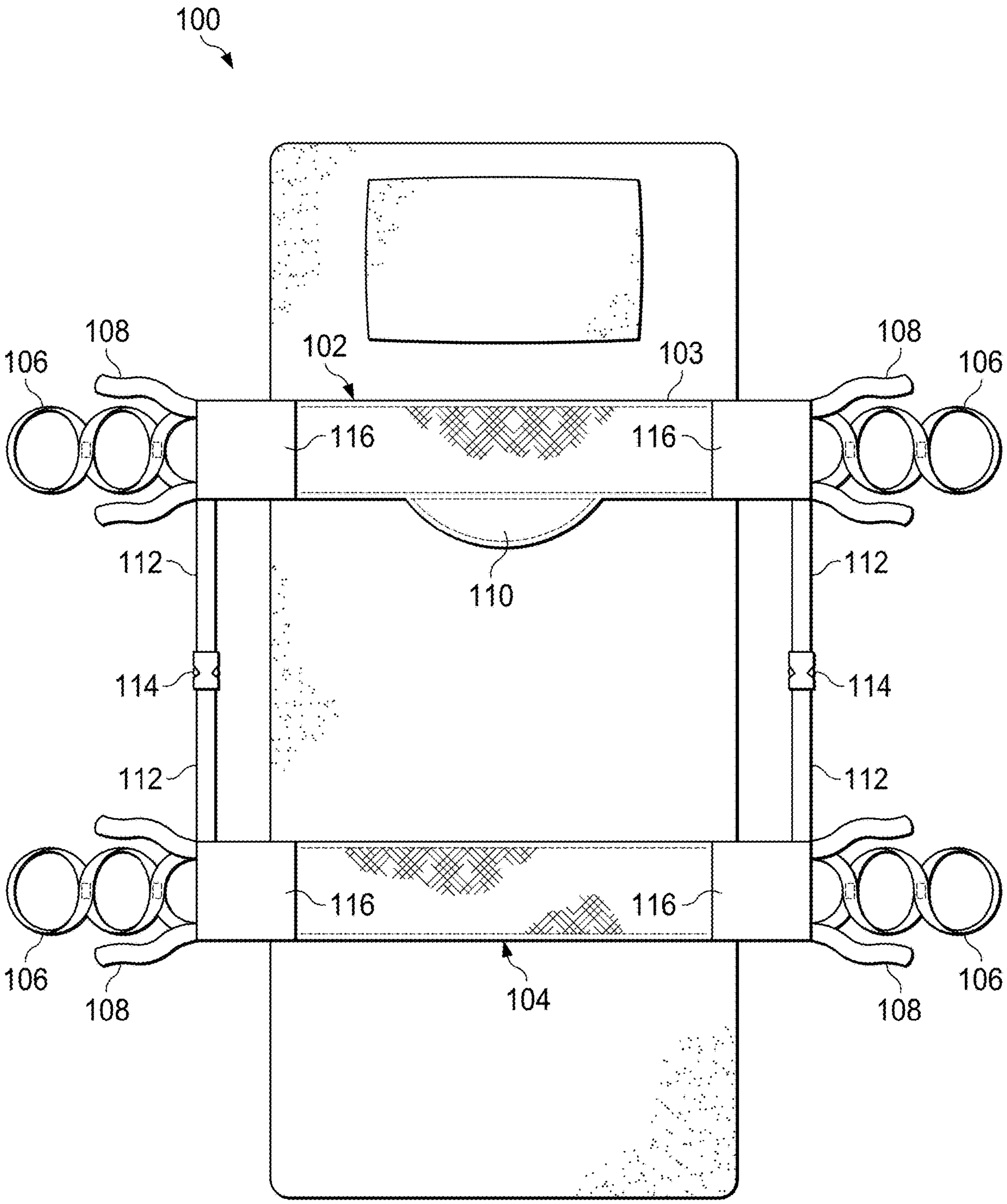
Figure 3:
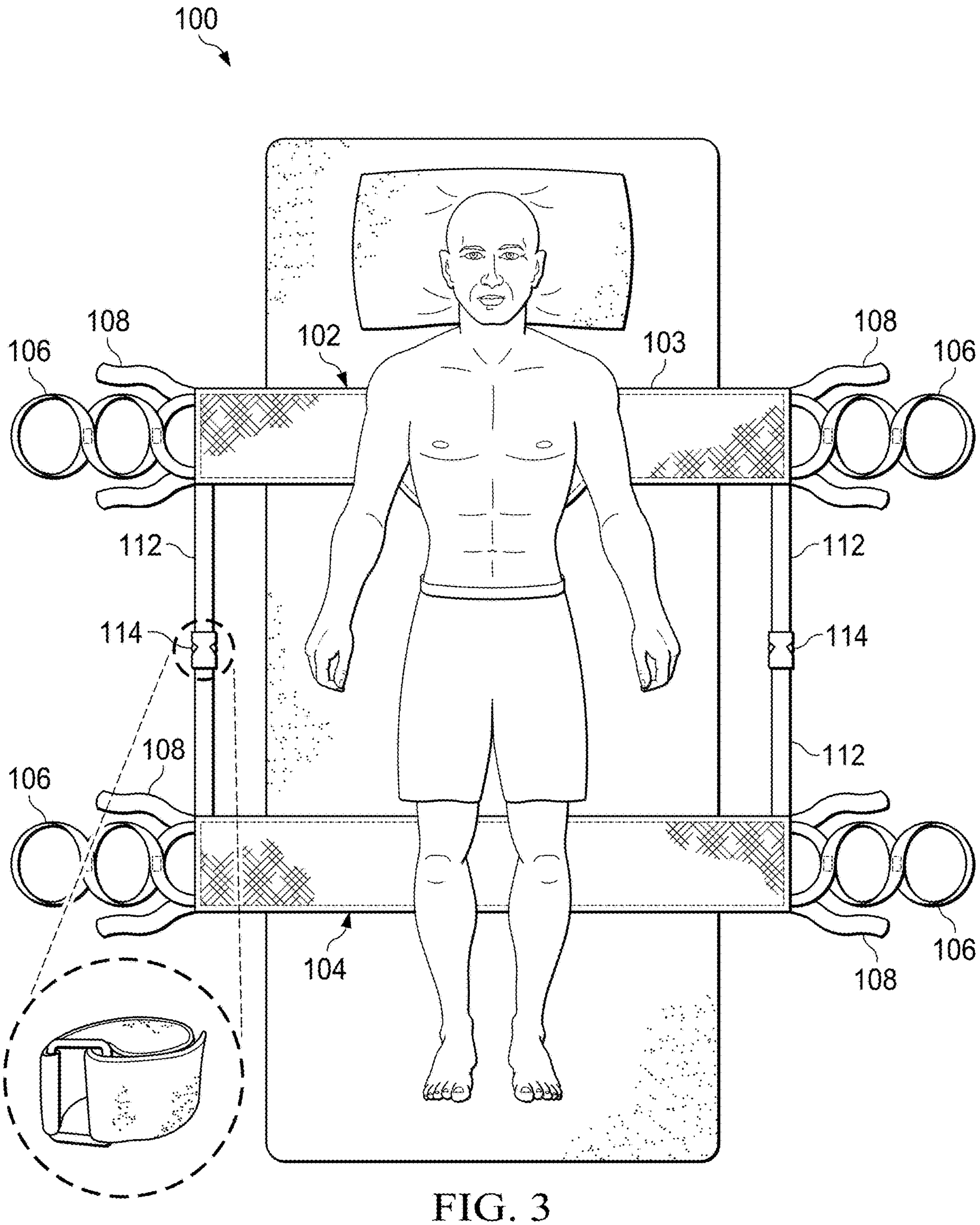
Figure 4:
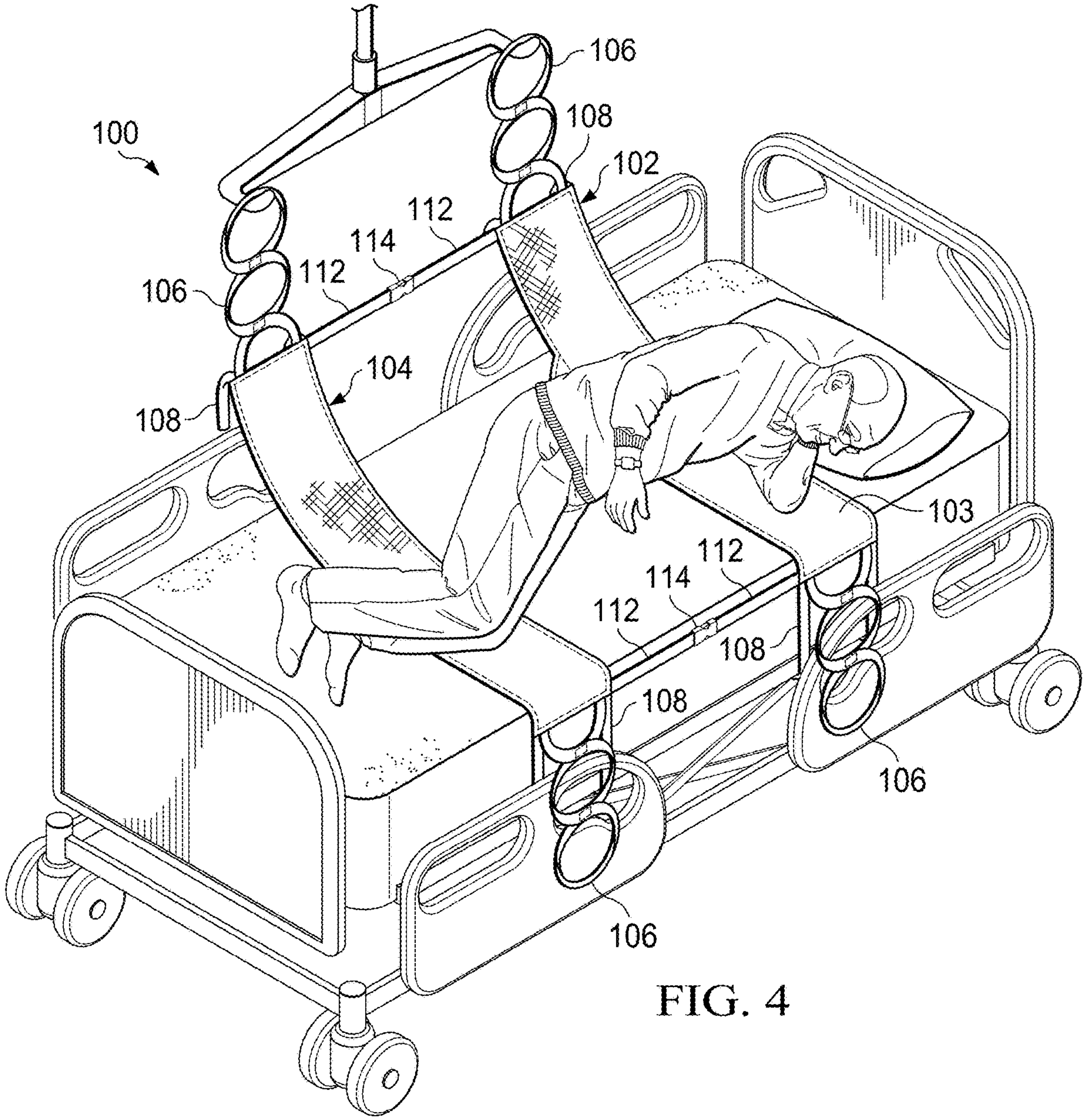

FIGS. 1 through 5, described below, and the various embodiments used to describe the principles of the present disclosure are by way of illustration only and should not be construed in any way to limit the scope of the disclosure. Those skilled in the art will understand that the principles of the present disclosure may be implemented in any type of suitably arranged device or system.

Current incontinence care methods in hospitals have an increased risk of injury to caregivers, nurses, and family caring for bedbound loved ones at home. They are forced to strain their own body to rotate and hold the patient's weight to maintain the patient's sideways position while changing diapers, incontinence pads, linen, etc. This process can take an extended period of time depending on how much cleaning is needed and the weight of the patient. Increased injury in nurses and staff also leads to staffing shortages and increased health care costs for the hospital in work related injury claims and potentially lifelong injuries to caregivers and nurses alike.

Also, the patient or bed bound person can experience humiliation or embarrassment while several staff members are required to reposition and clean each time a patient goes to the bathroom. Patients may end up withholding incontinence episodes from staff out of guilt and shame thus increasing patients' risk for skin breakdown and wounds.

Current slings in most hospitals do not allow access to the patients backside including slings that are full sheets covering an entire surface of the bed and body (such as a repositioning sling or transfer slings), slings that only support the upper body (such as twin turner sling), slings not suitable for turning (such as chair slings), and slings not designed to hold or reposition the patient on their side or withstand heavier weight limits or safely anchor to the bed to mitigate injury to a patient with a sling sliding out from under the patient (such as limb slings).

The incontinence sling of the present disclosure can mitigate potential nurse injuries by eliminating lengthy strain that is caused by the holding position of the caregiver during the incontinence care process, wound care, assessment and changing of linen/bathing the patient.

FIGS. 1 through 4 illustrate an example incontinence care sling 100 in accordance with this disclosure. As shown in FIGS. 1-4, the incontinence care sling 100 can be used to rotate a patient using either an overhead lift/ceiling lift or a portable lift. The incontinence care sling 100 can include an upper body sling 102 and a lower body sling 104. The upper body sling 102 can be positioned on the torso of the patient, such as under the shoulders of the patient. The lower body sling 104 can be positioned on the legs, such as under the knees. Each of the upper and lower body slings 102 and 104 can be formed of a material strong enough to support the weight of a patient, while also being breathable. Examples for the material of the body straps can include heavy polyester mesh or a spacer mesh. Other non-limiting examples of materials that could be used for the body straps include cotton, polyester, polyester mesh, polyester spacer mesh, polyester webbing and hook and loop, coated polyester webbing, urethane coated nylon, nylon fabric, cloth, fleece, H-cloth (high heat breathable polyester to withstand 200° F.), c-cloth fabric polyester (withstands temperature up to 167° F.), disposable material, wool, acrylic, rayon, antimicrobial polyester mesh, spacer fabric mesh, padded fabric, solid fabric, heavy duty knitted fabric or high grade polyester fiber fabric. The upper body sling 102 and the lower body sling 104 can further include a hem 103 around a border of the respective slings.

The upper and lower body slings 102 and 104 also include loop straps 106 on each end of the respective upper and lower body slings 102 and 104. The loop straps 106 are used to connect to a mechanical lift device or to manually grab. The loop straps 106 can be provided in multiple loops in series. The multiple loops allow for connections of the sling at different distances to accommodate for different size patients. The loop straps 106 can be made of material suitable for supporting the upper and lower body slings 102 and 104, such as a polyester. Other non-limiting examples of materials used for the loop straps 106 include coated polyester strap, polypropylene webbing strap, nylon webbing strap, polyester cord strap, vinyl, polyester (PET) strapping, hook and loop straps, buckle straps or plastic.

The upper and lower body slings 102 and 104 can further include anchor straps 108 for connecting to anchor points on anchor device under mattress. The anchor straps 108 can maintain a position of the upper and lower body slings 102 and 104 and tension on the sheet to not interfere with the comfort of the patient. The anchor straps 108 can be included on both ends of the upper and lower body slings 102 and 104. The anchor straps 108 and the loop straps 106 can extend from the same ends of the upper and lower body slings 102 and 104. The anchor straps 108 can include a hook and loop material or a buckle strap. The anchor straps 108 can be looped around an anchor such as the hospital bedframe and connect to itself or can be directly connect to an anchor. As a non-limiting example, the anchor strap 108 can have a three-inch handle attached to a three inch width by five inch length by one inch thick board that can be positioned under a mattress. This allows a nurse to attach a hook and loop connection for the anchor to remain secured. A bedframe facing a side of an anchor board can have magnets while a mattress facing side of the board can grit tape or a vinyl material to prevent slipping out from under the mattress.

The upper body sling 102 includes a spinal arch support 110. The spinal arch support 110 is a protrusion from a long edge of the upper body sling 102. The spinal arch support 110 provides additional support for the spine while rotating the patient. The spinal arch support 110 can be made from the same material as the upper body sling 102. In certain embodiments, the spinal arch support 110 can be a quilted stitch design. The quilted stitch design prevents the fabric from tearing and provides extra support to shape. The spinal arch support 110 can be in any suitable shape including a semicircle or a minor segment of a circle. The minor segment of a circle can be defined by a chord 111 that extends as a straight line between two points on a circumference of a circle and does not extend through the center of the circle. A major segment of the circle is an area of the circle on one side of the chord that is larger than an area of the other side of the chord 111, which is referred to as the minor segment. Using a minor segment as a protrusion from edge of the upper body sling 102 can provide support for a spine of the patient that the major segment would not provide. In certain embodiments, the chord 111 of the minor segment can be greater than 1.5 times a radius of the same circle. In certain embodiments, the hem 103 does not extend along the edge portion of the upper body sling 102 corresponding to the chord 111 where the spinal arch support 110 and the upper body sling 102 are made from the same fabric or material sheet. In certain embodiments, the spinal arch support 110 is sewn or otherwise connected to the hem 103 that extends an entirety of the border of the upper body sling 102 and has an additional hem 103 along the outer edge of the spinal arch support 110.

The incontinence care sling 100 also includes removeable adjustable positioning straps 112 on each end of the upper and lower body slings 102 and 104. The removeable adjustable positioning straps 112 of the upper body sling 102 connect to the removeable adjustable positioning straps 112 of the lower body sling 104. The removeable adjustable positioning straps 112 can maintain the positioning of the upper and lower body slings 102 and 104. The removeable adjustable positioning straps 112 can be made of any material and include any suitable coupling, such as hook and loop material. The removeable adjustable positioning straps 112 can include connectors 114, such as adjustable buckles or hook and loop cinch straps.

Pockets 116 can be included at each end of one (reverse) side of the upper and lower body slings 102 and 104. The pockets 116 can be made of the same material as the upper and lower body slings 102 and 104. The pockets 116 can be used by the staff to increase grip on the ends of the upper and lower body slings 102 and 104 to help positioning of the straps by inserting hands into pockets 116 and which allows easier ability to slide upper and lower body slings 102 and 104 underneath the patient for installation or repositioning of the upper and lower body slings 102 and 104.

Figure 5:
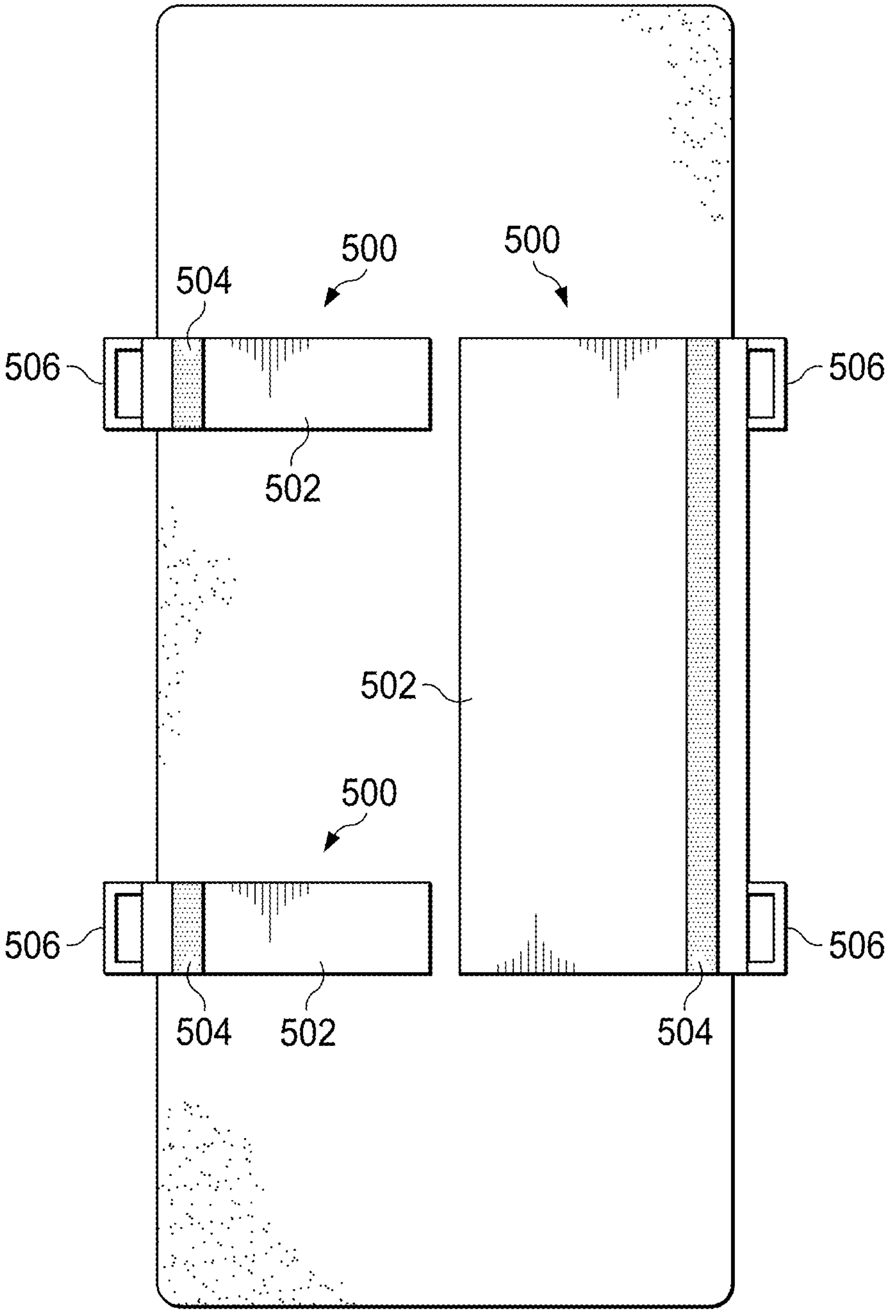
FIG. 5 illustrates an example sling anchors in accordance with this disclosure.

FIG. 5 illustrates an example of sling anchors 500 in accordance with this disclosure. As shown in FIG. 5, anchors can be used for when hospital beds with permanent anchor points are not available or, alternatively, as alternate anchor points on hospital beds with permanent anchor points. The anchor can be made of a material 502 to maintain the force of rotating a patient, such as wood, fiberglass, or plastic. The sling anchors 500 can include a material 504 with a high friction coefficient, such as grip tape or sandpaper on upper and lower surfaces to maintain positioning under a mattress on a first side and a magnetic material on an opposite side of the sling anchor 500. The anchors can include a handle 506 at one end to extend from the mattress to be used to secure the anchor straps via hook and loop material or an adjustable buckle strap to allow for various size beds like twin, full, or queen size beds. The handle 506 can be made of a metal, polyester strap, or heavy-duty plastic. In certain embodiments, the sling anchor 501 can extend a length that positions an upper handle 506*a* and lower handle 506*b* at a torso position and a lower body position. The amount of sling anchors 500 can vary. In certain embodiments, a sling anchor 500 can be provided as anchor points for each anchor strap 108 included on each of the upper and lower body slings 102 and 104. For example, the upper body sling 104 has a total of four anchor straps 108, e.g. two anchor straps 108 at each end, and two sling anchors 500 can be provided on each side of the bed.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112 (f) with respect to any of the appended claims or claim elements unless the exact words "means for" or "step for" are explicitly used in the particular claim, followed by a participle phrase identifying a function.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. An apparatus comprising:

an upper body sling comprising a first end and a second end;

a lower body sling comprising a first end and a second end;

a first anchor strap connected to the first end of the upper body sling;

a second anchor strap connected to the second end of the upper body sling;

a third anchor strap connected to the first end of the lower body sling;

a fourth anchor strap connected to the second end of the lower body sling;

a first connector comprising a first adjustable strap connecting the first end of the upper body sling to the first end of the lower body sling; and a second connector comprising a second adjustable strap connecting the second end of the upper body sling to the second end of the lower body sling, wherein the upper body sling is configured to adjustably attach to a lifting apparatus via the first anchor strap, wherein the upper body sling is configured to adjustably attach to a first anchor via the second anchor strap, wherein the lower body sling is configured to adjustably attach to the lifting apparatus via the third anchor strap, wherein the lower body sling is configured to attach to the second anchor via the fourth anchor strap, and wherein the first and second connectors can be adjusted to support a patient's torso and legs while providing access to a patient's backside.

2. The apparatus of claim 1, wherein at least one of the upper body sling or the lower body sling is made of a heavy polyester spacer mesh.

3. The apparatus of claim 1, wherein the upper body sling includes a spinal support protruding from an edge of the upper body sling at a midpoint of the upper body sling.

4. The apparatus of claim 3, wherein the spinal support is in a shape of a minor segment of a circle.

5. The apparatus of claim 4, wherein a chord of the minor segment is greater than 1.5 times a radius of the circle.

6. The apparatus of claim 1, wherein at least one of the first anchor strap or the second anchor strap comprises a loop strap configured to couple to the lifting apparatus.

7. The apparatus of claim 1, wherein at least one of the upper body sling or lower body sling includes a pocket positioned at an end of the sling.

8. The apparatus of claim 1, wherein the first anchor is provided by a sling anchor positioned under a mattress of a bed, wherein the first anchor includes a strap configured to position the sling anchor under the mattress.

9. The apparatus of claim 8, wherein the sling anchor further includes a material with a high friction coefficient on at least one surface of the strap.

10. The apparatus of claim 9, wherein the sling anchor further includes a handle extending from an end of the strap and configured to provide a support for the sling to couple to the sling anchor.

11. An apparatus comprising:

a sling anchor configured to position under a mattress of a bed; and a sling configured to support a patient, the sling including a plurality of anchor straps, wherein an anchor strap of the plurality of anchor straps is positioned at each corner of the sling and at least one of the anchor straps is configured to connect to the sling anchor to anchor at least one end of the sling, wherein the sling includes a spinal support protruding from an edge of the sling at a midpoint of the sling, and wherein the spinal support includes a hem around an outer edge of the spinal support.

12. The apparatus of claim 11, wherein the spinal support is made of a quilted stitch pattern.

13. An apparatus comprising:

an upper body sling comprising a first end and a second end;

a lower body sling comprising a first end and a second end;

a first anchor strap connected to the first end of the upper body sling;

a second anchor strap connected to the second end of the upper body sling;

a third anchor strap connected to the first end of the lower body sling;

a fourth anchor strap connected to the second end of the lower body sling;

a first connector comprising a first adjustable strap connecting the first end of the upper body sling to the first end of the lower body sling;

a second connector comprising a second adjustable strap connecting the second end of the upper body sling to the second end of the lower body sling; and a sling anchor configured to position under a mattress of a bed, the sling anchor comprising a first anchor, wherein the upper body sling is configured to adjustably attach to a lifting apparatus via the first anchor strap, wherein the upper body sling is configured to adjustably attach to the first anchor via the second anchor strap, wherein the lower body sling is configured to adjustably attach to the lifting apparatus via the third anchor strap, wherein the lower body sling is configured to attach to a second anchor via the fourth anchor strap, and wherein the first and second connectors can be adjusted to support a patient's torso and legs while providing access to a patient's backside.

14. The apparatus of claim 13, wherein at least one of the upper body sling or the lower body sling is made of a heavy polyester mesh of spacer mesh.

15. The apparatus of claim 13, wherein at least one of the upper body sling or lower body sling includes a pocket positioned at an end of the upper body sling or the lower body sling.

16. The apparatus of claim 13, wherein the sling anchor includes a strap configured to position the sling anchor under the mattress.

17. The apparatus of claim 16, wherein the sling anchor further includes a material with a high friction coefficient on at least one surface of on at least one surface of the strap and configured to maintain a position of the sling anchor under the mattress.

18. The apparatus of claim 17, wherein the sling anchor further includes a first handle extending from an end of the strap to provide the first anchor and a second handle extending from the end of the strap and configured to provide the second anchor.

19. The apparatus of claim 13, wherein the upper body sling includes a spinal support protruding from an edge of the upper body sling at a midpoint of the upper body sling.

20. The apparatus of claim 19, wherein the spinal support is in a shape of a minor segment of a circle.

* * * * *